United States Patent
Laumen et al.

(10) Patent No.: US 8,850,061 B2
(45) Date of Patent: Sep. 30, 2014

(54) MMS MESSAGE TRANSFER METHOD AND SYSTEM

(75) Inventors: Josef Laumen, Hildesheim (DE); Andreas Schmidt, Braunschweig (DE); Markus Trauberg, Velchede (DE); Sabine Van Niekerk, Salzgitter (DE)

(73) Assignee: Siemens Aktiengesellschaft, Munich (DE)

( * ) Notice: Subject to any disclaimer, the term of this patent is extended or adjusted under 35 U.S.C. 154(b) by 1646 days.

(21) Appl. No.: 10/520,767

(22) PCT Filed: Jun. 11, 2003

(86) PCT No.: PCT/DE03/01946
§ 371 (c)(1),
(2), (4) Date: Feb. 9, 2005

(87) PCT Pub. No.: WO2004/006593
PCT Pub. Date: Jan. 15, 2004

(65) Prior Publication Data
US 2005/0233731 A1     Oct. 20, 2005

(30) Foreign Application Priority Data

Jul. 9, 2002 (DE) .................. 102 30 897

(51) Int. Cl.
G06F 15/173 (2006.01)
H04W 4/12 (2009.01)
H04L 12/58 (2006.01)
H04W 88/18 (2009.01)
H04W 92/02 (2009.01)

(52) U.S. Cl.
CPC .............. *H04W 4/12* (2013.01); *H04W 88/184* (2013.01); *H04W 92/02* (2013.01); *H04L 51/30* (2013.01); *H04L 12/5875* (2013.01); *H04L 12/5895* (2013.01)

USPC ......................................... 709/238

(58) Field of Classification Search
USPC .......... 707/104.1; 379/88.13, 114.01, 114.03,
379/114.05, 114.06, 114.07, 114.21,
379/114.28, 114.29, 115.01, 121.01, 112,
379/127.05, 130, 133, 136, 265.09, 908;
455/405, 406, 407, 408; 370/261, 352,
370/353, 354, 389, 397, 392, 391, 395.5,
370/401, 410, 469, 465
See application file for complete search history.

(56) References Cited

U.S. PATENT DOCUMENTS 5,371,852 A  * 12/1994 Attanasio et al. ............ 709/245
6,282,274 B1 *  8/2001 Jain et al. .................. 379/114.26

(Continued)

FOREIGN PATENT DOCUMENTS

WO     WO 01/67268        9/2001
WO     WO 01/93558    * 12/2001   ........... H04M 15/00

OTHER PUBLICATIONS

XP-002225281—"3GPP TS 23.140 V5.3.0; 3r" Generation Partnership Project; Technical Specification Group Terminals; Multimedia Messaging Service (MMS): Functional descriotion Stage 2 (Release 5) Jun. 2002, pares 1-156.*
RFC 822, "Standard for the Format of ARPA Internet Text Messages", Aug. 13, 1982, WWW.faqs/rfcs/rfc822.html, pp. 1-43.*

(Continued)

*Primary Examiner* — Backhean Tiv
(74) *Attorney, Agent, or Firm* — King & Spalding L.L.P.

(57) ABSTRACT

The present invention relates to a method for transferring messages which includes the steps of transmitting a message from a first message service provider to a second message service provider, and evaluating the message (MMS) on the second message service provider's end, whereby the message contains at least one first header which includes a reference to at least one network element of the first message service provider, which was involved in the processing of the message.

24 Claims, 4 Drawing Sheets

(56) References Cited

U.S. PATENT DOCUMENTS

| | | | |
|---|---|---|---|
| 6,374,292 B1* | 4/2002 | Srivastava et al. | 709/206 |
| 7,069,301 B2* | 6/2006 | Jerbi et al. | 709/206 |
| 7,181,231 B2* | 2/2007 | Le Bodic et al. | 455/466 |
| 7,200,680 B2* | 4/2007 | Evans et al. | 709/246 |
| 7,212,807 B2* | 5/2007 | Laumen et al. | 455/412.1 |
| 8,131,824 B2* | 3/2012 | Laumen et al. | 709/219 |
| 2002/0078228 A1* | 6/2002 | Kuisma et al. | 709/237 |
| 2003/0172121 A1* | 9/2003 | Evans et al. | 709/206 |
| 2003/0193967 A1* | 10/2003 | Fenton et al. | 370/490 |
| 2004/0097248 A1* | 5/2004 | Schmidt et al. | 455/466 |
| 2005/0129022 A1* | 6/2005 | Mugica et al. | 370/392 |
| 2005/0193133 A1* | 9/2005 | Niemi et al. | 709/230 |
| 2005/0233731 A1* | 10/2005 | Laumen et al. | 455/412.2 |

OTHER PUBLICATIONS

XP-002225281—3GPP TS 23.140 V5.3.0; $3^{rd}$ Generation Partnership Project; Technical Specification Group Terminals; Multimedia Messaging Service (MMS); Functional description Stage 2 (Release 5) Jun. 2002, pp. 1-156.

XP-002259860—Simple Mail Transfer Protocol; Apr. 2001, pp. 1-79.

XP-002225280 —ETSI TS 122 140 V5.2.0; Universal Mobile Telecommunications System (UMTS); Service aspects, Stage 1; Multimedia Messaging Service , Jun. 2002, pp. 1-15.

3GPP TR ab.cde Vx.y.z.—$3^{rd}$ Generation Partnership Project; Technical Specification Group Terminals, Multiple MMS Relay/Server Architecture (Release 6), pp. 1-9.

* cited by examiner

MMS MESSAGE TRANSFER METHOD AND SYSTEM

BACKGROUND OF THE INVENTION

The above-described types of methods or systems are typically used in mobile radio devices.

The world's most widespread mobile radio system GSM (Global System for Mobile Communications), in addition to providing voice telephony, offers the option of sending or receiving short messages of up to 160 characters in length. This service is known as SMS (Short Message Service).

For mobile radio systems of the next generation (2.5G, 3G) such as UMTS (Universal Mobile Telecommunications System), a multimedia-capable variant of a mobile message service is known. With this message service, messages with multimedia contents, known as MMS (Multimedia Messaging Service) messages and abbreviated in this document to MMS, are sent. By contrast with SMS, MMS messages are not restricted purely to text content. In addition, it will be possible to format texts in accordance with individual taste as well as to embed audio and video content into a message.

MMS are described in detail In Technical Specifications TS 22.140 Version 5.1.0, Release 5 and TS 23.140 Version 5.3.0, Release 5 of the 3rd Generation Partnership Project (3GPP).

Figure 1:
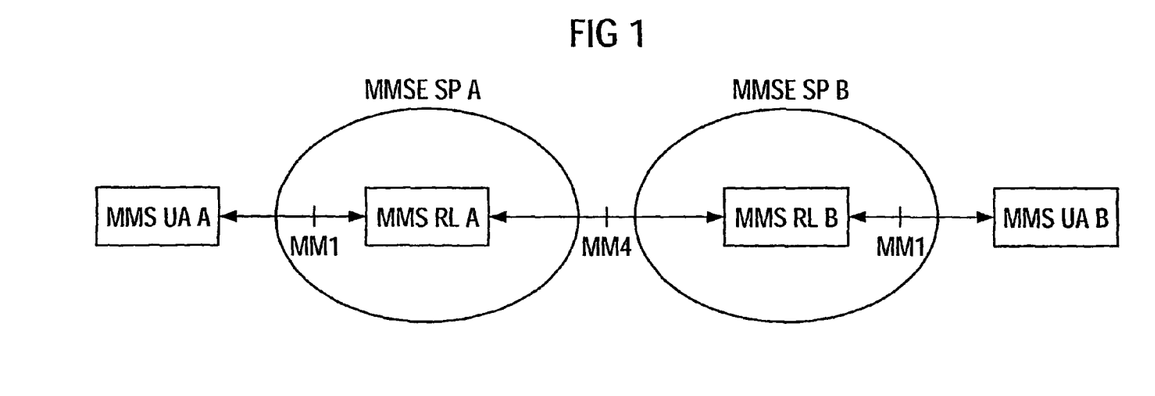
FIG. 1 shows a schematic diagram of a known network architecture.

FIG. 1 shows a known MMS network architecture with an MMS User Agent A (MMS UA A) and an MMS User Agent B (MMS UA B). MMS UA A or MMS UA B is an application, such as on a mobile radio terminal or a device connected to a mobile radio terminal, for instance a laptop or similar, which can implement MMS. FIG. 1 further shows two MMS service provider environments MMSE SP A and MMSE SP B (Multimedia Messaging Service Environment), and two network elements MMS RL A and MMS RL B (MMS Relay/Server). MMS RL A and MMS RL B are network elements which make MMS functionalities available to the user agents MMS UA A or MMS UA B within the area of responsibility of MMSE SP A or MMSE SP B.

Problems with this known MMS network architecture arise, however, when the network architecture is assembled from components from different manufacturers or components with a different functional scope. If, for example, an MMS service provider wishes to operate a number of MMS network elements MMS RL A, MMS RL B made by different manufacturers with different ranges of functions in their area of responsibility MMSE SP A or MMSE SP B, they must ensure, if a particular functionality is demanded for an MMS, such as on sending, relaying between two MMS service providers or delivery, that an MMS is only processed in the service environment by those network elements which support the functionalities, demanded. With many functionalities there is also the need for an MMS sent in response to a previously received original MMS to be processed by exactly the same network elements which have already processed the original MMS.

Accordingly, the present invention is directed toward a method and a system for the transmission of messages through which a network provider can dynamically expand his/her network architecture at any time by new network elements from different manufacturers or by components with a different functional scope, without having to run the risk of a service being processed by a network element which does not support the desired functionality.

SUMMARY OF THE INVENTION

As such, the invention method features the following steps:
Transmission of a message from a first message service provider to a second message service provider; and evaluation of the message at the second message service provider.

The message contains at least a first header field which features a reference to at least one network element of the first message service provider which was involved in the processing of the message. The messages are preferably MMS messages. In such MMS messages, header fields can be introduced for explicit referencing of network elements. Thus, for example, upon the relaying of an MMS message between two MMS service providers and upon delivery of an MMS message, a reference to that network element within the MMS service environment of the MMS service provider of the recipient or references to those network elements within the MMS network environments of the two MMS service providers which were involved in the processing of the MMS message can be transmitted along with the message. The present invention, however, also includes referencing of other network elements.

Preferably, the message is transmitted from the second message service provider to a network element outside the service environment, where the message contains at least a second header field which features a reference to at least one network element of the second message service provider which was involved in processing the message. The network element outside the service environment is preferably a terminal outside the MMSE service environment.

Preferably, message further contains, upon transmission from the second message service provider to the network element outside a service environment, the first header field which features a reference to at least one network element of the first message service provider which was involved in the processing of the message.

In a further embodiment the present invention, the message is returned by the network element outside the service environment via the second message service provider to the first message service provider, with the reference(s) set, in each case, from the first and/or second header field being resolved in the return step.

The present invention is preferably used in a GSM/GPRS (Global System for Mobile Communications/General Packet Radio Service) and/or UMTS network. However, use in other networks is also conceivable.

In a preferred embodiment of the present invention, the reference features a return path specification. The reference contained in an MMS can be used in replies to the MMS for explicitly addressing a specific network element for further processing of a reply MMS. The referencing of a network element is made possible by the introduction of a first and/or second header field. Thus, can be ensured that an MMS is only relayed to those network elements for processing which support a particular functionality which is required. For resolving the references from the first and second header field defined above for the individual return steps a third and a fourth header field may be introduced.

In a further embodiment of the present invention, the transferred message is evaluated after arrival at the second message service provider from a switching node. The switching node is preferably what is known as a router; i.e., a switching network computer. All MMS which arrive at an MMS network environment are first directed to the switching node. In a preferred embodiment, the message contains the functionality of the message in at least one header field. This allows the switching node to decide on the network element for which the MMS is suitable, since this supports the functionality demanded.

In a further embodiment of the present invention, the switching node defines as a function of a header field the network elements at a second message service provider to which the message will be relayed. After the evaluation of the header field by the network node, the network node decides on the network element within the area of responsibility of the MMS service provider to which such MMS will be directed for further processing.

In a further preferred embodiment of the present invention, the switching node is embodied as a self-contained network element.

In another preferred embodiment of the present invention, the switching node is integrated into a relay. The relay can be a network element such as, for example, a so-called "MMS RelayServer/"; i.e., a network computer for relaying MMS.

The present invention is also achieved by a system for transmitting messages featuring parts for transmission of a message from a first message service provider to a second message service provider and parts for evaluating the message in the second message service provider, with the message containing at least a first header field which features a reference to at least one network element of the first message service provider which was involved in the processing of the message.

The present invention further relates to a mobile radio terminal and/or a transceiver for use with the inventive method and/or with the inventive system.

Additional features and advantages of the present invention are described in, and will be apparent from, the following Detailed Description of the Invention and the Figures.

DETAILED DESCRIPTION OF THE INVENTION

FIG. 1 shows an MMS network architecture in accordance with the prior art which has already been described in the background of the specification.

Figure 2:
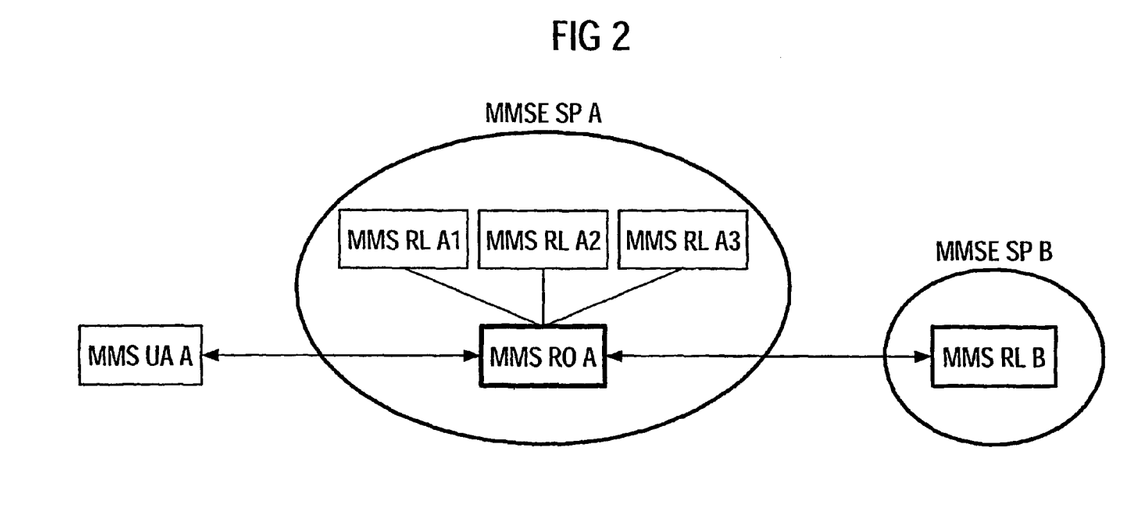
FIG. 2 shows a schematic diagram of an exemplary embodiment of a network architecture with an MMS switching node and a number of MMS network elements.

FIG. 2 shows an exemplary embodiment of an MMS network architecture. A network environment MMSE SP A of a first network service provider A and a network environment MMSE SP B of a second network service provider are shown. The MMSE SP A includes a switching node MMS RO A and three separate network elements MMS RL A1, MMS RL A2 and MMS RL A3. The switching node MMS RO A is connected to a user agent MMS UA A. The second network environment MMSE SP B includes a network element MMS RL B. In the exemplary embodiment, it is assumed that the MMS service provider A has gradually expanded his/her network environment MMSE SP A with different network elements MMS RL A of different manufacturers or with different functional scopes. It is further assumed that the network element MMS RL A3 supports the newest MMS version and is equipped with particular functionalities, while the two other network elements MMS RL A1 and MMS RL A2 only handle the MMS basic functionalities. The choice of a specific network element in the network environment of the MMS service provider is made by the centrally arranged switching node MMS RO A which is responsible for the distribution of all MMS arriving in the area of responsibility MMSE SP A.

Figure 3:
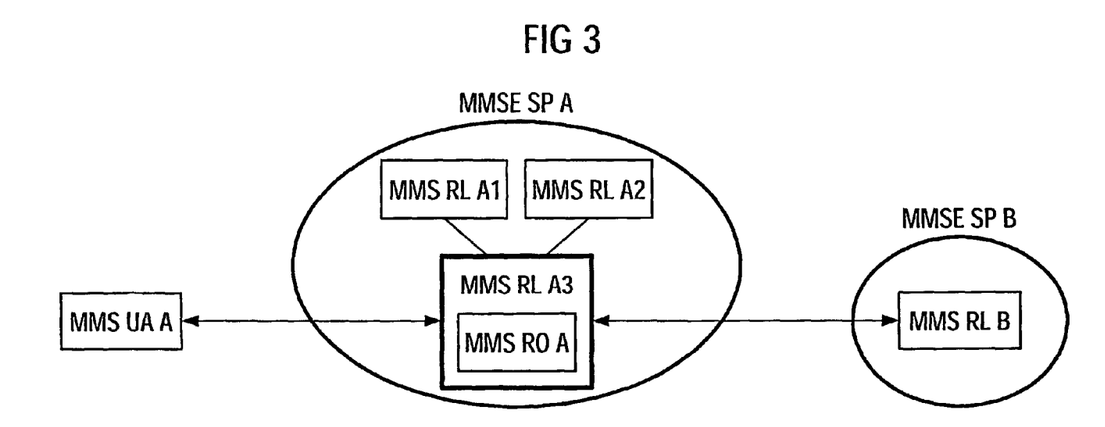
FIG. 3 shows a schematic diagram of an exemplary embodiment of a network architecture with an MMS switching node and MMS network elements.

FIG. 3 shows a further exemplary embodiment of an MMS network architecture. With regard to the definition of the elements shown in FIG. 3, reference is made to FIGS. 1 and 2. In the exemplary embodiment in accordance with FIG. 3, the functionality of the connection node MMS RO A is integrated into the network element MMS RL A3. This performs the central function of the MMS switching node.

Figure 4:
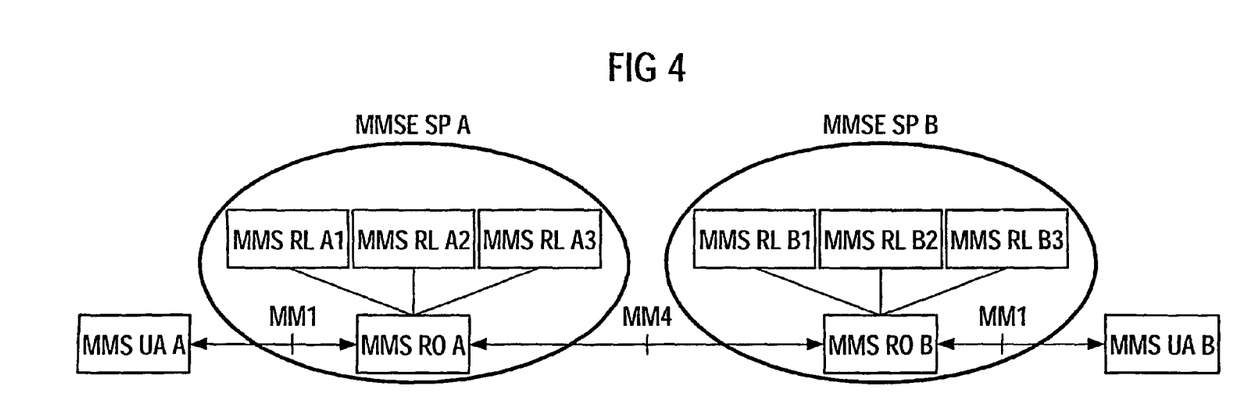
FIG. 4 shows a schematic diagram of an exemplary embodiment of a network architecture.

FIG. 4 shows an exemplary embodiment of a network architecture in which sender and recipient make use of the MMS service of different MMS service providers and the MMS service providers in their MMS service environment have a number of MMS network elements available of which a number support a desired functionality. With regard to the definition of the elements shown in the FIG. 4, reference is made to FIGS. 1 to 3. Elements shown on the user agent B side have the corresponding meaning. A user agent A (MMS UA A) would like, in this exemplary embodiment, when sending an MMS to user agent B (MMS UA B), to make use of what is known as a reply charging functionality. As such, it is prepared to accept the costs for a reply MMS from the recipient. To this end, he/she compiles an MMS on his/her terminal (MMS UA A), addresses it to recipient B, marks it with the reply charging identification and sends it via the interface MM1 to his/her network service provider MMS SP A. The MMS sent by the MMS UA A is designated the original MMS to enable it to be distinguished from the reply MMS sent later by the MMS UA B user agent.

Each MMS, after reaching a network environment, is initially directed to the switching node MMS RO A or MMS RO B. Here, the header fields are investigated for whether the MMS is to be relayed because of a specific functionality to a specific network element in the network environment of the network service provider. In the present exemplary embodiment, the switching MMS RO A finds a reply charging identification in the header field of the original MMS, at which point it forwards the MMS to an MMS network element which it knows supports this reply charging functionality. It is assumed that this is the case for MMS network element MMS RL A3. The outstanding feature of the reply charging functionality applied for by the sender is that particular function-specific data, such as, for example, the reply deadline and the identity of the original MMS, are stored in the MMS network element until the deadline set by the sender has expired or the expected response MMS has arrived from the recipient of the original MMS. For this reason, the reply MMS also must be processed by the same MMS network element MMS RL A3 as the original MMS.

After the transmission of the original MMS to the network environment MMSE SP B of recipient B, the original MMS also arrives at the switching node MMS RO B for evaluation of the header field there. On the basis of the reply charging identification, the MMS is relayed in the network environment MMSE SP B to a network element MMS RL B2 which supports the reply charging functionality. The further processing of the original MMS with reply charging identification is undertaken in the network element MMS RL B2. There the function-specific data is stored until the deadline assigned by the sender has elapsed or the expected reply MMS has arrived from user agent B.

After the delivery of the original MMS to the MMS UA B of the recipient, the latter can reply to the original MMS by itself compiling a new MMS on its terminal MMS UA B, addressing it to the recipient A, identifying it as the reply MMS and sending it via the interface MM1 to its MMS service provider MMSE SP B. The message is identified by an extra header field defined for this purpose, in which the message ID of the original MMS is entered.

This exemplary embodiment of reply charging describes a case in which a reply MMS arriving in a network environment may not be relayed to just any network element present in the network environment, but only to that element which was active when the original MMS was sent and knows about the function-specific peripheral conditions. This is also the case when all network elements support the specific functionality. In the present example of the reply charging, the function-specific peripheral conditions are the deadline and the message identification. The connection nodes MMS RO A can enter a path entry for possible response MMS in each original MMS which leaves the network environment MMSE SP A. Preferably, the switching node MMS RO B stores a path specification set in the network environment MMSE SP A until the arrival of a reply MMS or until the deadline expires. Upon arrival of a reply MMS, the switching node must be able to read out this path specification and insert it again within the deadline. The database needed for storing this switching information is connected to the MMS switching node or integrated into it.

With the present invention, an original MMS is provided with a return path specification upon exit from a network environment. This enables a specific network element in the network environment of an MMS service provider, such as the network element which has been active in the processing of the original MMS and has knowledge of the function-specific peripheral conditions, to be referenced on sending a reply MMS. Preferably, a network element is accessed via an Internet protocol (IP) address. The Internet protocol address also may be determined from a specified Universal Resource Identifier (URI) by evaluating the name of the host computer, known as the domain name system host name. The return path specification also may be an e-mail address. In this case, it is also conceivable for the network element to be addressed via another process of identification.

Figure 5:
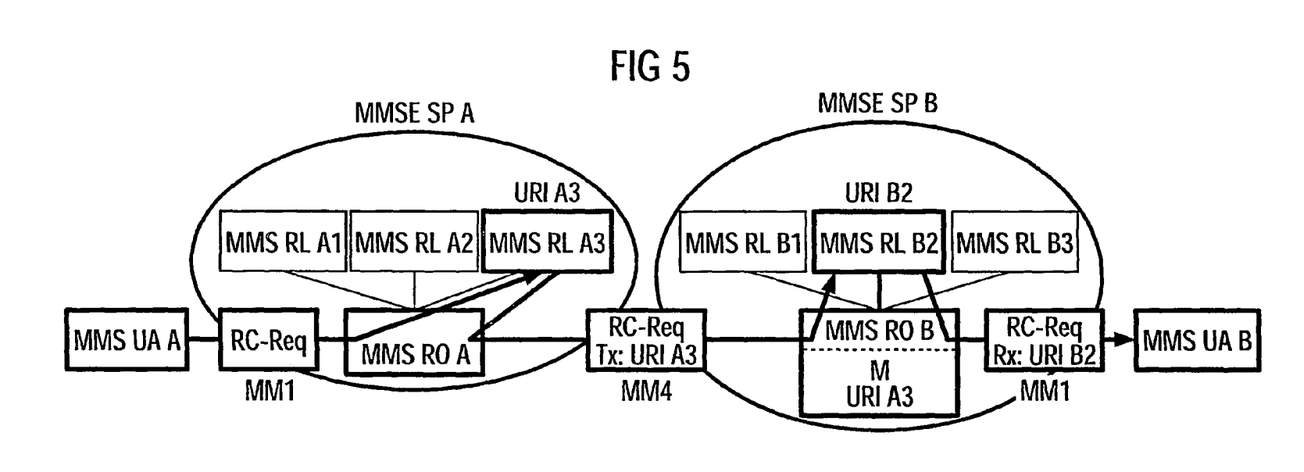
FIG. 5 shows a schematic diagram of an exemplary embodiment of a network architecture for sending an MMS with reply charge recording.

FIG. 5 shows a schematic diagram of sending an original MMS with a reply charging identification in an MMS network architecture. With regard to the definition of the elements shown, reference is made to the description of FIGS. 1 to 4, with similarly named elements having the same meaning. MM1 and MM4 represent interfaces. In this exemplary embodiment, all the information needed for the transport of an MMS as well as the supplementary information for the reply charging functionality is entered as information elements in short messages; i.e., what are known as abstract messages. Abstract messages involve blocks of information transmitted between two MMS units connected to one another, with each information block containing at least one information element. Abstract messages are explained in detail in Technical Specification TS 23.140 Version 5.3. 0, Release 5, of the 3rd Generation Partnership Project (3GPP).

If a device involved in this exchange of data does not recognize an information element, the latter is relayed unchanged. Different information elements must be defined for the interfaces MM1 and MM4. If only one new information element is defined and used at both interfaces, a return channel allocated by the connection node MMS RO A in the network environment B of the receiver could be relayed unchanged to user agent MMS UA B if the network service provider MMSE SP B cannot recognize these information elements. In this case, the user agent MMS UA B, that is the recipient of the original MMS and sender of the reply MMS, could attempt, possibly using the return path issued by the switching node MMS RO A, to send a response MMS to its MMS service provider MMSE SP B. This path specification is however, is only valid for network environment A and cannot be evaluated by network environment B. The corresponding compatibility problems can be resolved by defining different information elements for the interfaces MM1 and MM4.

FIG. 5 shows a transmission of an original MMS from agent MMS UA A of sender A to agent MMS UA B of recipient B, with RC-Req standing for the reply charging identification and URI A3 (MM4) or URI B2 (MM1, B-side) for the references of the two network elements involved in the transmission. Tx stands for transmission and Rx stands for reception and the distinction of the MMS network environment of the sender from that of the recipient. With regard to the definition of the elements shown, reference is made to the description of FIGS. 1 to 5 with similarly named elements having the same meaning. Switching node MMS RO B either can store the path specification of the MMS switching node MMS RO A until the reply MMS arrives in the memory M of the switching node MMS RO B or can transfer it to the user agent MMS UA B.

Figure 6:
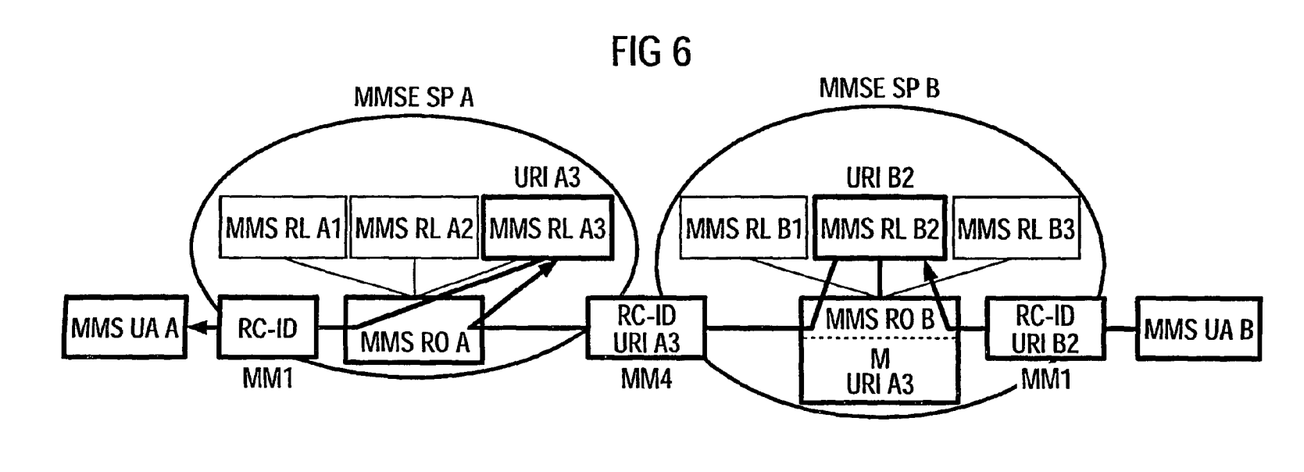
FIG. 6 shows a schematic diagram of an exemplary embodiment of a network architecture on dispatch of a reply MMS.

If a reply MMS is returned by the user agent MMS UA B of the recipient to the network environment MMSE B (interface MM1, B-side) with the specification of the return path previously transferred in the original MMS, the switching node MMS RO B, after evaluation of the return channel, can forward the reply MMS to the network element within the network environment B which supports the desired reply charging functionality and exhibits knowledge of the function-specific peripheral conditions. In the present exemplary embodiment, this would be network element MMS RL B2, characterized by the reference URI B2. The same principle applies to the relaying of the reply MMS from network environment B to network environment A via interface MM4. The return path for this interface is either transferred with the MMS UA B of the sender or read out from memory M in the switching node MMS RO B. A corresponding procedure is shown in FIG. 6. In network environment A, the switching node MMS RO A, after evaluating the return path, can forward the reply MMS to the corresponding network element which supports the desired reply charging functionality within the network environment A and has knowledge about the function-specific peripheral conditions. In the present exemplary embodiment, this would be network element MMS RL A3, characterized by the reference URI A3.

As already mentioned, FIG. 6 shows an exemplary embodiment of a transmission of a reply MMS from MMS user agent MMS UA B to user agent MMS UA A. With regard to the definition of the elements shown, reference is made to the explanations for FIGS. 1 to 5, with similarly named elements having the same meaning. Furthermore, RC-ID stands for the message ID of the original MMS received beforehand which identifies the sent MMS as reply MMS. URI B2 (MM1, B-side) or URI A3 (MM4) stand for the references of the network elements active during the transmission of the original MMS in the two network element environments involved.

Figure 7:
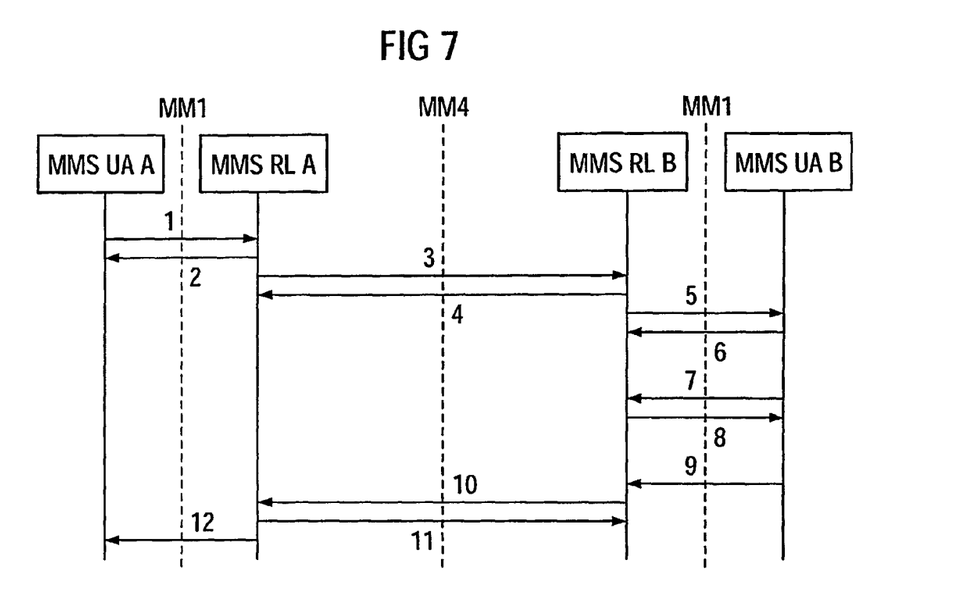
FIG. 7 shows a flowchart representing the transmission of an MMS.

FIG. 7 shows a flowchart for sending an MMS using the abstract messages described here. As already explained, the abstract messages each contain at least one information element which is exchanged between the two entities involved. FIG. 7 shows two user elements; i.e., an initiating user agent MMS UA A and a receiving user agent MMS UA B. The two user agents are connected to network elements MMS RL A or MMS RL B. An MMS is sent by user agent MMS UA A to network element MMS RL A for the interface MM1 on the sender side via a abstract message 1. Network element MMS RL A confirms the correct receipt of the MMS with abstract message 2. An MMS is transmitted between two MMS network environments (via the interface MM4) with abstract message 3 and is confirmed with abstract message 4. For interface MM1 on the recipient MMS UA B side, the following abstract messages are defined: The recipient is informed about an MMS which is ready for downloading with the aid of the abstract message 5, and this can be acknowledged with abstract message 6. With abstract message 7, the recipient MMS UA B can initiate the downloading of an MMS available on the network element. The MMS is delivered from the network element MMS RL B to the user agent MMS UA B via abstract message 8. Abstract message 9 serves both to confirm the correct transmission of the MMS with abstract message 8 and also to inform network element MMS RL B whether the recipient of the MMS agrees to a reply being sent or not. This reply can be requested by the sender in advance, together with the sending of the MMS, in abstract message 1 and, if necessary, is transferred with abstract message 10 to the network environment of the sender and from there with abstract message 12 on to the user agent MMS UA A of the sender of the MMS. Abstract message 11 is used to send a confirmation.

To enable what is known as a return path to be transmitted as described on the interfaces MM1 and MM4, two new information elements are defined, namely a transmit return path and a receive return path, with transmission or receipt identifying the network environment of the sender or the network environment of the recipient. To specify the return path on sending a reply MMS, two further information elements transmit destination and receive destination are defined.

The new information element transmit return path is inserted into abstract message 3. For enhanced convenience, this new information element also may be inserted into abstract message 2, which also makes it possible for the sender to directly access a network element which has processed the original MMS that he/she sent;, for example, if he/she wants to recall or update this message later. The new return path information element is supplemented in abstract message 8 and the new receive destination information element is used in abstract message 1.

If the return path of the network environment A cannot be buffered in the network environment B and it is also to be sent with abstract message 8 to user agent MMS UA B and from there is to be returned in abstract message 1 together with the reply MMS to network environment B, abstract message 8 must be expanded by the new information element transmit return path and abstract message 1 must be expanded by the new information element transmit destination.

Figure 8:
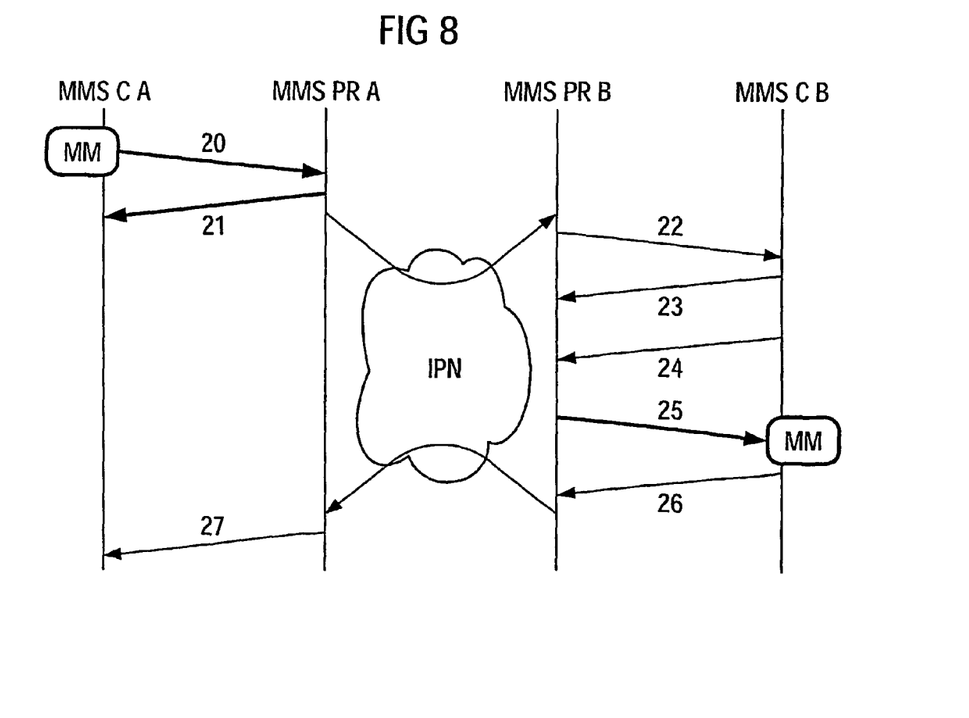
FIG. 8 shows a flowchart representing the transmission of an MMS in accordance with the WAP standard.

FIG. 8 shows a flowchart of an exemplary embodiment of the implementation of the present invention in accordance with the WAP (Wireless Application Protocol) standard for mobile radio terminals. WAP is an open standard for communication between a mobile radio terminal and the Internet. To bridge the air interface between a mobile radio terminal supporting MMS and the WAP node point there is provision for the use of the WAP transfer protocol. FIG. 8 shows an exchange of WAP messages between four entities involved; i.e., the MMS client MMS C A, the MMS network element MMS PR A, the MMS network element MMS PR B and the MMS client MMS C B. The relevant messages are transmitted along the arrows indicated by the numbers 20, 21 and 25. First a message transmission request 20 is sent by MMS C A to MMS PR A. This is followed by confirmation 21. Between MMS PR A and MMS PR B there is the Internet IPN. MMS PR B issues an MMS notification 22 which is answered by a notification 23. As shown by arrow 24, there then follows a WAP data request command 24, which is answered by the MMS delivery 25. This is followed by a message transfer confirmation 26. On the sender side, this can be relayed to MMS C A, as shown by arrow 27.

Confirmation 21 is supplemented by a header field transmit return path, to enable the return channel to be transferred after receipt of an original MMS to the MMS client of the sender, so that the latter has knowledge of which MMS network element (MMS PR) in the area of responsibility of an MMS service provider it should address in the event of a recall or exchange command or similar. MMS message 25 is supplemented by the header field receive return path, with the aid of which the MMS client of the recipient is informed about the return path of that MMS network element in the area of responsibility of an MMS service provider, to which the reply MMS is to be returned for further processing. If necessary the transmit return path specification is also supplemented in this MMS message. However, this is only necessary if this information is not buffered or cannot be buffered in the network environment B. The message transmit request 20 is expanded by the header field receive destination and, if necessary, also by the header field transmit destination for resolution of the path entries. This allows an MMS to be relayed explicitly to the network elements in the area of responsibility of the MMS service provider involved. Preferably, the field values of the header fields are encoded in the MMS messages as text strings.

In the exemplary embodiments described herein the present invention has been explained on the basis of the reply charging functionality, since the function-specific data needed here is only known in each case to an MMS network element within a service area, which makes specifying a return path for smooth functioning of a service essential. The present invention is not, however, restricted to reply charging functionality, but also can, for example, be applied to functionalities such as recalls and replacements of MMS already sent and similar functionalities in which the storage of function-specific data is essential for a smoothly functioning service. With these functionalities, the option of explicitly accessing a network element is also required.

Although the present invention has been described with reference to specific embodiments, those of skill in the art will recognize that changes may be made thereto without departing from the spirit and scope of the present invention as set forth in the hereafter appended claims.

The invention claimed is:

1. A method for transmission of messages, comprising:
    transmitting a message from a first message service provider to a second message service provider, wherein the message contains at least a first header field which includes a reference to a specific network element of the first message service provider, which was involved in processing the message,
    evaluating the message at the second message service provider, and
    transmitting, via an interface connecting the first and second message service provider, a confirmation message from the second message service provider addressed directly to the specific network element of the first message service provider as identified by the first header field.

2. A method in accordance with claim 1, further comprising
transmitting the message from the second message service provider to a network element outside a service environment with the message containing at least a second header field which features a reference to at least one network element of the second message service provider which was involved in the processing of the message.

3. A method in accordance with claim 2, wherein the message, on transmission from the second message service provider to the network element outside a service environment contains the first header field which features a reference to at least one network element of the first message service provider which was involved in the processing of the message.

4. A method in accordance with claim 2, further comprising
transmitting the message from the network element outside the service environment back via the second message service provider to the first message service provider, with the reference(s) set from the first and/or second header field being resolved in each return transmission step.

5. A method in accordance with claim 1, wherein the reference further includes a specification of a return path.

6. A method in accordance with claim 1, wherein the transmitted message is evaluated after arrival at the second message service provider from a switching node.

7. A method in accordance with claim 1, wherein the functionality of the message is evident from at least one header field.

8. A method in accordance with claim 6, wherein the switching node determines, as a function of a header field, to which network element in the second message service provider the message will be relayed.

9. A method in accordance with claim 3, wherein a switching node is embodied as a self-contained network element.

10. A method in accordance with claim 3, wherein a switching node is integrated into a relaying means.

11. A system for transmission of messages, comprising:
a first message service provider configured to transmit a message to-a second message service provider, wherein the message contains at least a first header field which includes a reference to a specific network element of the first message service provider, which was involved in processing the message,
a device for evaluating the message at the second message service provider, and
a network element of the second message service provider is configured to directly transmit, via an interface connecting the first and second message service provider, a confirmation message addressed directly to the specific network element of the first message service provider as identified by the first header field.

12. A system in accordance with claim 11, wherein the second message service provider is configured to transmit the message to a network element outside a service environment, the message containing at least a second header field which features a reference to at least one
network element of the second message service provider which was involved in the processing of the message.

13. A system in accordance with claim 12, wherein the message, on transmission from the second message service provider to the network element outside a service environment, contains the first header field which features a reference to at least one network element of the first message service provider which was involved in the processing of the message.

14. A system in accordance with claim 12, wherein the network element outside the service environment back is configured to transmit the message via the second message service provider to the first message service provider, with the reference(s) set from the first and/or second header field being resolved in each return transmission step.

15. A system in accordance with claim 11, wherein the reference further includes a specification of a return path.

16. A system in accordance with claim 11, wherein a switching node is configured to evaluate the message after arrival at the second message service.

17. A system in accordance with claim 11, wherein the at least one required function of the message is evident from at least one header field.

18. A system in accordance with one of the claims 16, wherein the switching node determines, as a function of a header field, the network element in the second message service provider to which the message will be relayed.

19. A system in accordance with one of the claims 16, wherein the switching node is embodied as a self-contained network element.

20. A system in accordance with one of the claims 16, wherein the switching node is integrated into a relaying means.

21. A system in accordance with claim 11, wherein the system includes a mobile radio terminal.

22. A method in accordance with claim 1, further including using a mobile radio terminal.

23. A system in accordance with claim 11, wherein the system includes a Transceiver.

24. A method in accordance with claim 1, further including using a Transceiver.

* * * * *